United States Patent [19]
Müller et al.

[11] Patent Number: 5,164,173
[45] Date of Patent: Nov. 17, 1992

[54] PREPARATION OF STABILIZED ACICULAR FERROMAGNETIC CHROMIUM DIOXIDE

[75] Inventors: Norbert Müller, Friedelsheim; Manfred Ohlinger, Frankenthal; Rainer Feser, Gruenstadt; Bernhard Böttcher, Weisenheim; Peter Rudolf, Maxdorf; Werner Hübner, Frankenthal, all of Fed. Rep. of Germany

[73] Assignee: BASF Aktiengesellschaft, Ludwigshafen, Fed. Rep. of Germany

[21] Appl. No.: 199,865

[22] Filed: May 27, 1988

[30] Foreign Application Priority Data

May 30, 1987 [DE] Fed. Rep. of Germany ....... 3718299

[51] Int. Cl.$^5$ .................. C01G 37/02; C01G 49/08
[52] U.S. Cl. ............................ 423/607; 423/594; 423/595; 252/62.56; 252/62.51
[58] Field of Search ............. 423/594, 595, 607; 252/62.56, 62.51 C; 427/127, 220

[56] References Cited

U.S. PATENT DOCUMENTS

| | | | |
|---|---|---|---|
| 3,512,930 | 5/1970 | Bottjer | 252/62.51 C |
| 3,686,031 | 8/1972 | Balthis | 423/594 |
| 3,687,726 | 8/1972 | Pye | 428/404 |
| 3,767,580 | 10/1973 | Kitamoto et al. | 423/607 |
| 3,911,095 | 10/1975 | Montiglio et al. | 423/607 |
| 4,009,111 | 2/1977 | Tamai | 252/62.55 |
| 4,340,494 | 7/1982 | Ohlinger | 423/607 |
| 4,670,177 | 6/1987 | Ohlinger et al. | 252/62.55 |

FOREIGN PATENT DOCUMENTS

| | | |
|---|---|---|
| 2152331 | 12/1973 | Fed. Rep. of Germany . |
| 2749757 | 5/1979 | Fed. Rep. of Germany . |
| 51-21200 | 2/1976 | Japan . |
| 61-82323 | 4/1986 | Japan . |

OTHER PUBLICATIONS

H. Fikentscher, Cellulose-Chemie 3 (1931) p. 58.
IBM Technical Disclosure Bulletin vol. 25, No. 11B Apr., 1983 p. 6031.

Primary Examiner—Gary P. Straub
Assistant Examiner—Steven Bos
Attorney, Agent, or Firm—Keil & Weinkauf

[57] ABSTRACT

Stabilized acicular ferromagnetic chromium dioxide is prepared by a method in which the chromium dioxide surface formed as a result of a reductive treatment is treated with adsorbed monobasic or polybasic hydroxycarboxylic acids.

5 Claims, No Drawings

PREPARATION OF STABILIZED ACICULAR FERROMAGNETIC CHROMIUM DIOXIDE

The present invention relates to a process for the preparation of stabilized acicular ferromagnetic chromium dioxide by treatment of the chromium dioxide surface produced by a reductive treatment.

The preparation of acicular chromium dioxide and the use of this material for magnetic recording media has been described in many publications. Magnetic recording media which contain chromium dioxide generally have superior magnetic properties compared with recording media based on other magnetic oxides.

However, it is also known that the magnetic properties of recording media containing unstabilized chromium dioxide deteriorate in the course of time. Ferromagnetic chromium dioxide in powder form is substantially stable in the absence of moisture and, furthermore, there is no detectable change in the magnetic properties over a long period. However, it has been observed that chromium dioxide may be attacked by both water and other materials, for example by the organic polymer binders used in the preparation of magnetic recording media, with decomposition to give nonmagnetic components. In the case of magnetic recording media, this means not only a deterioration in the magnetic and therefore electroacoustic properties but also deterioration of the mechanical properties. This deterioration is further accelerated at relatively high temperatures. There has therefore been no lack of attempts to overcome these disadvantages. For example, U.S. Pat. No. 3,512,930 describes the treatment of chromium dioxide powder with a reducing agent. In other processes, alumina coatings (U.S. Pat. No. 3,687,726) and coatings of sparingly soluble metal phosphates (U.S. Pat. No. 3,686,031) are produced. The application of metal compounds whose cations are capable of forming sparingly soluble chromates has also been disclosed (DE-B 21 52 331). JA-A-21200/76 proposes the application of magnetic iron oxides to the surface in order to coat the chromium dioxide particles, while according to DE-A-27 49 757 iron(III)-containing oxidic deposits are applied to the chromium dioxide.

All these processes improve the stability of the chromium dioxide either by applying to the particle surface a precipitate which may consist of both a foreign substance and a sparingly soluble chromate, or by reductive treatment of the particle surface, with the result that a stable compound of trivalent chromium also forms as a surface layer. In spite of these efforts to ensure the stability of the chromium dioxide, and taking into account the appropriate safety measures in the processing to give magnetic recording media, it is observed that the stability of the residual magnetization of this recording media is not unlimited. As extensive tests have shown, the instability of the chromium dioxide material in a magnetic layer, particularly at relatively high temperatures, is predominantly due to the humidity of the surrounding air. As a result of attack by atmospheric moisture, the chromium dioxide undergoes a reaction which is the reverse of its preparation reaction and is cleaved into a chromium(III) oxide-containing compound and chromate ions, the latter subjecting the organic components of the magnetic layer to oxidative attack. Thus, the stability of the chromium dioxide in the magnetic layer is scarcely affected at 0% relative humidity and only a high relative humidity, for example 95%, leads to a deterioration even in the case of stabilized chromium dioxide. This shows that stabilization of the chromium dioxide by the prior art methods improves the chromium dioxide but under unfavorable conditions may not be sufficient to prevent the effect of water vapor.

It is an object of the present invention to improve the known processes for stabilizing chromium dioxide in such a way that the disadvantages described no longer occur and, in particular, a chromium dioxide is provided in which the chromium(VI) ions which may form subsequently as a result of disproportionation cannot adversely affect the magnetic recording medium.

We have found that this object is achieved by a process for the preparation of stabilized acicular ferromagnetic chromium dioxide by reaction of oxides of trivalent and hexavalent chromium at from 200° to 600° C. in a high pressure reactor under from 100 to 700 bar in the presence of water with the addition of one or more modifiers and subsequent reductive treatment of the surface of the chromium dioxide in an aqueous suspension with formation of a compound of trivalent chromium on the surface, if from 0.1 to 5% by weight, based on the amount of chromium dioxide, of a monobasic or polybasic hydroxycarboxylic acid of 2 to 6 carbon atoms are adsorbed onto the surface of a chromium dioxide stabilized by the reductive treatment.

The preparation of the acicular ferromagnetic chromium dioxide is known, as is the reductive treatment of the chromium dioxide for the purpose of stabilization. For example, EP-B 27 640 and EP-A 198 110 describe the preparation of chromium dioxide materials which have particularly advantageous magnetic properties and narrow particle size distributions owing to the use of special modifiers based on antimony, selenium, tellurium and/or iron or their compounds. The reductive stabilization of the surface of these chromium dioxides is also described there. U.S. Pat. No. 3,512,930 also describes this process. In the preparation, it may be advantageous to subject the chromium dioxide to a heat treatment before the reductive treatment. This can be done, for example, by a method in which the material obtained in the synthesis is comminuted to an agglomerate size of from 0.1 to 1 mm and then heated at from 150° to 350° C., in general from 270° to 330° C.

To carry out the novel treatment of the surface of the stabilized chromium dioxide, the latter is suspended in water by, for example, vigorous stirring. It is advantageous to maintain a ratio of 1 part of powder to not less than 12 parts of water. An aqueous solution of a monobasic or polybasic hydroxycarboxylic acid of 2 to 6 carbon atoms is then added to this suspension. The amount of dissolved substance can be determined by means of a few experiments. It must be such that from 0.1 to 5% by weight of the stated hydroxycarboxylic acid are adsorbed onto the surface. Preferably, the amount is chosen so that from 0.5 to 2% by weight, based on the amount of chromium dioxide, are adsorbed. The monobasic or polybasic hydroxycarboxylic acids which are suitable for the novel process are selected in particular from the group consisting of tartaric acid, citric acid and ascorbic acid. After further stirring for a conventional period of up to one hour, the moist filter cake is dried at below 100° C., usually at from 50° to 70° C.

The chromium dioxide obtained by the novel treatment has an extremely low content of elutable chromium(VI) ions while retaining the excellent magnetic properties of the material. This improvement in the properties of the chromium dioxide material is particularly useful when it is used for the preparation of magnetic recording media and is embedded in the magnetic layer containing organic polymers.

The chromium dioxide prepared according to the invention is processed to give magnetic recording media by a conventional method. For the production of the magnetic layer, from 2 to 5 parts by weight of chromium dioxide are processed with one part of the binder or binder mixture and the suitable dispersants, lubricants and other conventional additives in a total amount of up to 10% by weight, based on the chromium dioxide, to give a dispersion. The dispersion thus obtained is filtered and is applied by means of a conventional coating apparatus, for example a knife coater, to the nonmagnetic base in one or more thin layers or is applied in a thin layer to a magnetic recording medium already provided with another magnetic layer. Before the liquid coating mixture is dried at from 50° to 90° C., magnetic orientation of the chromium dioxide particles may be carried out. For a special surface treatment of the magnetic layer, the coated webs are passed between heated polished rollers under pressure. Thereafter, the thicknesses of the magnetic layers are usually from 1.5 to 12 $\mu$m.

The binders used for the magnetic layers may be the known polymer binders, such as acrylate copolymers, polyvinyl acetals, such as polyvinylformal or polyvinylbutyral, fairly high molecular weight epoxy resins, polyurethanes and mixtures of these and similar binders. Substances which have proven advantageous are elastomeric and virtually isocyanate-free linear polyester urethanes which are soluble in a volatile organic solvent and can be prepared by reacting a polyester of an aliphatic dicarboxylic acid of 4 to 6 carbon atoms, such as adipic acid, and one or more aliphatic diols of 3 to 10 carbon atoms, such as 1,2- and 1,3-propylene glycol, butane-1,4-diol, diethylene glycol, neopentylglycol or octane-1,8-diol, with a diisocyanate of 6 to 24, in particular 8 to 20, carbon atoms, such as toluylene diisocyanate or 4,4'-diisocyanatodiphenylmethane, preferably in the presence of a relatively small amount of a glycol of 4 to 10 carbon atoms, such as butane-1,4-diol, which acts as a chain extender. Preferred polyesterurethanes are those obtained from adipic acid, butane-1,4-diol and 4,4'-diisocyanatodiphenylmethane. Preferred polyesterurethanes have a Shore A hardness of from 70 to 100, a tensile strength of from 40 to 42 N/mm$^2$ (according to DIN 53,455) and an elongation at break (according to DIN 53,455) of about 440–560%. The K value according to H. Fikentscher (Cellulose-Chemie -3 (1931), 58 et seq.) is from 40 to 60 for the particularly suitable polymer binders.

Magnetic recording media which are prepared using the chromium dioxide obtained according to the invention possess, in addition to the known good electroacoustic characteristics, improved stability under conditions of high temperature and humidity and good mechanical properties, in particular good adhesion.

The Examples which follow illustrate the invention in comparison with a prior art comparative experiment. Parts and percentages are by weight, unless stated otherwise. Parts by volume bear the same relation to parts by weight as that of the liter to the kilogram.

EXAMPLE 1

2.19 l of water are initially taken in a reaction vessel having a volume of 4 l. Thereafter, 5.68 kg of chromium trioxide ($CrO_3$) are initially added, while stirring. After 10 minutes, 26 g of potassium antimonyl tartrate ($KSbO(C_4H_4O_6)0.5\ H_2O$, molecular weight 333.93), i.e. 0.33% by weight, based on chromium dioxide, and 67 g of acicular $\gamma$-$Fe_2O_3$, i.e. 0.85% by weight, based on chromium dioxide, are added. When the gas evolution which begins as a result of the addition of the antimony-containing modifier has died down, 2.84 kg of chromium-(III) oxide are introduced with constant stirring, and stirring is continued for a further 20 minutes. Thereafter, the reaction suspension is heated to 300°–350° C. in an autoclave. During this procedure, chromium dioxide is formed. The oxygen formed builds up pressure, which is kept at 300–400 bar by means of a pressure relief valve. After the end of the reaction, the reactor is let down and cooled in such a way that the chromium dioxide is obtained with a residual moisture content of from 1 to 5%. It is removed mechanically from the reaction vessel, heated at 300° C., milled, suspended in an aqueous sodium sulfite solution and then comminuted by wet milling. During this procedure, 10% of the chromium dioxide is reduced at the crystal surface and converted to chromium-(III) oxide hydroxide. After filtration and washing, the chromium dioxide is again suspended in water, and 158 g of ascorbic acid in the form of a 14% strength solution (2% by weight, based on the chromium dioxide) are added, stirring is carried out for one hour, the mixture is filtered and the product is then dried at 50° C. under reduced pressure.

For the resulting chromium dioxide, the BET specific surface area [m$^2$/g] is measured and the magnetic properties are determined by means of a vibrating sample magnetometer in a magnetic field of 160 kA/m at a mean sample density p[g/cm$^3$], these properties being the coercive force $H_c$ in (kA/m) and the specific remanence $M_r$/p in (nTm$^3$/g). In addition, the content of chromium-(VI) ions was determined photometrically using diphenylcarbazide (DIN 53,780) in an aqueous extract obtained according to DIN 38,414-S4.

The results of the measurements are shown in Table 1.

COMPARATIVE EXPERIMENT 1

The procedure described in Example 1 is followed, except that the aftertreatment with ascorbic acid is omitted. The results of the measurements are shown in Table 1.

EXAMPLE 2

2.19 l of water are initially taken in a reaction vessel having a volume of 4 l. Thereafter, 5.68 kg of chromium trioxide ($CrO_3$) are initially added, while stirring. After 10 minutes, 26 g of potassium antimonyl tartrate ($KSbO(C_4H_4O_6).0.5\ H_2O$, molecular weight 333.93), i.e. 0.33% by weight, based on chromium dioxide, and 20 g of acicular $\gamma$-$Fe_2O_3$, i.e. 0.25% by weight, based on chromium dioxide, are added. When the gas evolution which begins as a result of the addition of the antimony-containing modifier has died down, 2.84 kg of chromium-(III) oxide are introduced with constant stirring, and stirring is continued for a further 20 minutes. Thereafter, the reaction suspension is heated to 300°–350° C. in an autoclave. During this procedure, chromium dioxide is formed. The oxygen formed builds up pressure, which is kept at 300–400 bar by means of a pressure relief valve. After the end of the reaction, the reactor is let down and cooled in such a way that the chromium dioxide is obtained with a residual moisture content of from 1 to 5%. It is removed mechanically from the reaction vessel, milled, suspended in an aqueous sodium sulfite solution and then comminuted by wet milling. During this procedure, 10% of the chromium dioxide are reduced at the crystal surface and converted to chromium-(III) oxide hydroxide. 32 g of ascorbic acid in the form of a 4% strength solution in water (0.4% by weight, based on $CrO_2$) are introduced into the aqueous chromium dioxide suspension and stirring is continued for a further hour. After filtration and washing, drying is carried out at 50° C. under reduced pressure.

The results of the measurements are shown in Table 1.

COMPARATIVE EXPERIMENT 2

The procedure described in Example 2 is followed, except that the aftertreatment with ascorbic acid is omitted. The results of the measurements are shown in Table 1.

EXAMPLE 3

2.19 l of water are initially taken in a reaction vessel having a volume of 4 l. Thereafter, 5.68 kg of chromium trioxide ($CrO_3$) are initially added, while stirring. After 10 minutes, 27 g of potassium antimonyl tartrate ($KSbO(C_4H_4O_6) \cdot 0.5\ H_2O$, molecular weight 333.93), i.e. 0.34% by weight, based on chromium dioxide, and 24 g of acicular $\gamma\text{-}Fe_2O_3$, i.e. 0.3% by weight, based on chromium dioxide, are added. When the gas evolution which begins as a result of the addition of the antimony-containing modifier has died down, 2.84 kg of chromium-(III) oxide are introduced with constant stirring, and stirring is continued for a further 20 minutes. Thereafter, the reaction suspension is heated to 300°–350° C. in an autoclave. During this procedure, chromium dioxide is formed. The oxygen formed builds up pressure, which is kept at 300–400 bar by means of a pressure relief valve. After the end of the reaction, the reactor is let down and cooled in such a way that the chromium dioxide is obtained with a residual moisture content of from 1 to 5%. It is removed mechanically from the reaction vessel, milled, suspended in an aqueous sodium sulfite solution and then comminuted by wet milling. During this procedure, 10% of the chromium dioxide are reduced at the crystal surface and converted to chromium-(III) oxide hydroxide. After filtration and washing, the chromium dioxide is again suspended in water, and 158 g of ascorbic acid in the form of a 14% strength solution (2% by weight, based on the chromium dioxide) are added, stirring is carried out for one hour, the mixture is filtered and the product is then dried at 50° C. under reduced pressure.

The results of the measurements are shown in Table 1.

COMPARATIVE EXPERIMENT 3

The procedure described in Example 3 is followed, except that the aftertreatment with ascorbic acid is omitted. The results of the measurements are shown in Table 1.

EXAMPLE 4

The procedure described in Example 1 is followed, except that, instead of the ascorbic acid, 135 g of tartaric acid (2% by weight, based on $CrO_2$) are used for the aftertreatment.

The results of the measurements are shown in Table 1.

EXAMPLE 5

The procedure described in Example 1 is followed, except that, instead of the ascorbic acid, 172 g of citric acid (2% by weight, based on $CrO_2$) are used for the aftertreatment.

The results of the measurements are shown in Table 1.

EXAMPLE 6

2.19 l of water are initially taken in a reaction vessel having a volume of 4 l. Thereafter, 5.68 kg of chromium trioxide ($CrO_3$) are initially added, while stirring. After 10 minutes, 23 g of potassium antimonyl tartrate ($KSbO(C_4H_4O_6) \cdot 0.5\ H_2O$, molecular weight 333.93), i.e. 0.30% by weight, based on chromium dioxide, and 55 g of acicular $\gamma\text{-}Fe_2O_3$, i.e. 0.68% by weight, based on chromium dioxide, are added. When the gas evolution which begins as a result of the addition of the antimony-containing modifier has died down, 2.84 kg of chromium-(III) oxide are introduced with constant stirring, and stirring is continued for a further 20 minutes. Thereafter, the reaction suspension is heated to 300°–350° C. in an autoclave. During this procedure, chromium dioxide is formed. The oxygen formed builds up pressure, which is kept at 300–400 bar by means of a pressure relief valve. After the end of the reaction, the reactor is let down and cooled in such a way that the chromium dioxide is obtained with a residual moisture content of from 1 to 5%. It is removed mechanically from the reaction vessel, milled, heated for 1 hour at 300° C., suspended in an aqueous sodium sulfite solution at 85° C. and comminuted by wet milling. During this procedure, 20% of the chromium dioxide are reduced at the crystal surface and converted to chromium(III) oxide hydroxide. 16 g of ascorbic acid in the form of a 4% strength solution in water (0.2% by weight, based on $CrO_2$) are introduced into the aqueous chromium dioxide suspension and stirring is continued for a further hour. After filtration and washing, drying is carried out at 50° C. under reduced pressure.

The results of the measurements are shown in Table 1.

COMPARATIVE EXPERIMENT 6

The procedure described in Example 6 is followed, except that the aftertreatment with ascorbic acid is omitted. The results of the measurements are shown in Table 1.

TABLE 1

| | BET | $H_c$ | $M_r/\rho$ | $CrO_3$ |
|---|---|---|---|---|
| Example 1 | 25.9 | 44.4 | 42.0 | 0.3 |
| Comparative Experiment 1 | 26.3 | 43.9 | 45.1 | 4.2 |
| Example 2 | 25.6 | 38.8 | 43.6 | 3.2 |
| Comparative Experiment 2 | 25.1 | 38.1 | 44.1 | 6.2 |
| Example 3 | 26.4 | 40.5 | 44.8 | 0.34 |
| Comparative Experiment 3 | 26.2 | 40.3 | 44.4 | 4.4 |
| Example 4 | 27.1 | 43.9 | 43.6 | 2.3 |
| Example 5 | 27.6 | 44.3 | 44.4 | 2.1 |
| Example 6 | 22.5 | 39.7 | 40.1 | 0.0 |
| Comparative Experiment 6 | 22.0 | 39.5 | 39.9 | 0.3 |

EXAMPLE B 1

102 kg of tetrahydrofuran, 26.3 kg of a 50% strength solution of the polyureaurethane according to Example 8 of DE-A-32 27 161, 27.8 kg of a polyesterurethane solution prepared according to German Published Application DAS 2,753,694, 100 kg of a chromium dioxide prepared according to Example 1, 2.5 kg of zinc oleate, 0.25 kg of a commercial silicone oil and 1 kg of n-butyl stearate were introduced into a steel ball mill having a capacity of 600 parts by volume, containing 600 kg of steel balls and having a diameter of from 4 to 6 mm, and the mixture was dispersed for 36 hours. The dispersion was then filtered under superatmospheric pressure, provided, while stirring, with 0.039 part, per part of the dispersion, of a 75% strength solution of a triisocyanate of 3 moles of toluy-lene diisocyanate and 1 mole of trimethylolpropane, and immediately thereafter applied to a 12 $\mu$m thick polyethylene terephthalate film. The coated film was passed through a magnetic field to align the magnetic particles and then dried at from 50° to 80° C. and calendered by being passed between heated rollers under pressure, so that the resulting thickness of the dry layer was 5.5 $\mu$m.

The surface of the magnetic layer had an average peak-to-valley height Rz of 0.15 $\mu$m, measured according to DIN 4756, page 1. The coated film was slit into 3.81 mm wide magnetic tapes.

The magnetic tapes were tested as follows:

1 Magnetic properties

The magnetic properties of the resulting magnetic tapes were determined by means of a vibrating sample magnetometer in a magnetic field of 160 kA/m. The coercive force Hc in [kA/m] and the residual magnetization Mr in [mT] were measured, and the orientation ratio Rf is calculated as the quotient of the residual induction in the playing direction to that in the crosswise direction.

2. Electroacoustic properties

The electroacoustic properties were measured according to DIN 45,512, page II, against the standard chromium dioxide reference tape C 520-R with a biassing current of 20 mA. All electroacoustic taoe data, maximum output level at long wavelengths $A_T$ and sensitivity $E_T$ at 1 kHz, maximum output level at short wave-lengths $A_H$ and sensitivity $E_H$ at 10 kHz, signal-to-bias noise ratio at rest $RG_o$ and signal to print-through ratio Ko, are based on the reference tape C 520-R, the latter being set at OdB for all parameters.

3. Stability under high temperature and humidity conditions

The stability at 65° C. and 95% relative humidity was determined for the magnetic recording medium; for this purpose, a magnetic recording medium was stored for one week in a conditioning cabinet under these conditions and in each case the residual magnetization was measured at room temperature and expressed as a percentage of the initial value. The magnetic properties were determined using the vibrating sample magnetometer in a magnetic field of 160 kA/m.

4. Eluate test

The water-soluble Cr(VI) in an extract prepared according to DIN 38,414-S4 was determined photometrically using diphenylcarbazide, as described in DIN 53,780. For the preparation of the extract, 100 g of the relevant magnetic tape were used, the amount of Cr(VI) being stated in mg per liter of extract.

The results of the measurements are shown in Table 2.

EXAMPLES B2-B8, BV1, BV2, BV3, BV6

The procedure described in Example B1 was followed, except that the corresponding chromium dioxide samples of Examples 2 to 6 and of Comparative Experiments 1, 2, 3 and 6 were used. The results of the measurements are shown in Table 2.

TABLE 2

|  | B1 | BV1 | B2 | BV2 | B3 | BV3 | B4 | B5 | B6 | BV6 |
|---|---|---|---|---|---|---|---|---|---|---|
| Hc | 43.7 | 43.9 | 37.9 | 37.9 | 40.1 | 40.2 | 44.3 | 44.5 | 37.7 | 37.8 |
| Mr | 161 | 159 | 165 | 167 | 159 | 167 | 161 | 152 | 158 | 157 |
| Stability | 87 | 82 | 85.1 | 80.3 | 89.5 | 86.1 | 84 | 84.1 | 94.4 | 92.5 |
| Eluate | 0 | 4.5 | 2.1 | 28 | 1.9 | 31 | 8.4 | 10.2 | 1.3 | 2.8 |
| $E_T$ | −0.6 | 0 | 0.6 | 0.4 | −0.2 | 0.5 | −1.2 | −1.2 | 0 | 0.1 |
| $E_H$ | 2.2 | 2.2 | 0.5 | 0 | −0.5 | 0 | 0.3 | 0 | −0.2 | −0.3 |
| $A_T$ | −0.6 | 0.3 | 1 | 0.7 | −0.2 | 0.5 | −1.2 | −1.2 | −0.2 | −0.1 |
| $A_H$ | 3 | 3 | −0.2 | −0.5 | −0.5 | 0 | 0.4 | 0.6 | −0.7 | −0.4 |
| $RG_o$ | 1.8 | 2 | 2 | 2 | 3 | 2 | 3 | 3 | 1.6 | 1.3 |
| $K_o$ | 56 | 59 | 56 | 56 | 57.5 | 57.5 | 60 | 59.5 | 59 | 59 |

We claim:

1. In a process for the preparation of stabilized acicular ferromagnetic chromium dioxide particles by reaction of oxides of trivalent and hexavalent chromium at from 200° to 600° C. in a high pressure reactor under from 100 to 700 bar in the presence of water with the addition of at least one modifier based on antimony, selenium, tellurium and/or iron or their compounds and subsequent reductive treatment of the surface of the resulting chromium dioxide in an aqueous suspension with the formation of a compound of trivalent chromium on the surface, the improvement which comprises: absorbing from 0.1 to 5.0% by weight, based on the amount of chromium dioxide, of a hydroxycarboxylic acid of 2 to 6 carbon atoms onto the surface of the chromium dioxide particles subsequent to the reductive treatment of the particles.

2. The process of claim 1, wherein the hydroxycarboxylic acid adsorbed onto the surface of the chromium dioxide is a monobasic hydroxycarboxylic acid of 2 to 6 carbon atoms.

3. The process as claimed in claim 1, wherein the hydroxycarboxylic acid adsorbed onto the surface of the chromium dioxide is a polybasic hydroxycarboxylic acid of 2 to 6 carbon atoms.

4. The process as claimed in claim 1, wherein from 0.5 to 2% by weight, based on the amount of chromium dioxide, of ascorbic acid is adsorbed onto the surface of the stabilized chromium dioxide.

5. The process as claimed in claim 4 wherein the chromium dioxide is heated at from 150° to 350° C. prior to the reductive treatment.

* * * * *

UNITED STATES PATENT AND TRADEMARK OFFICE
CERTIFICATE OF CORRECTION

PATENT NO.   : 5,164,173
DATED        : NOV. 17, 1992
INVENTOR(S)  : MÜLLER et al.

It is certified that error appears in the above-identified patent and that said Letters Patent is hereby corrected as shown below:

in claim 1, column 8, line 47:  "absorbing"    should read   --adsorbing-- in claim 4, column 8, line 60:  "as claimed in" should read   --of-- in claim 5, column 8, line 64:  "as claimed in" should read   --of-- in claim 3, column 8, line 56:  "as claimed in" should read   --of--

Signed and Sealed this

Second Day of November, 1993

Attest:

BRUCE LEHMAN

*Attesting Officer*          *Commissioner of Patents and Trademarks*